United States Patent [19]

McKeown et al.

[11] Patent Number: 5,439,082
[45] Date of Patent: Aug. 8, 1995

[54] HYDRAULIC INERTIAL VIBRATION ISOLATOR

[75] Inventors: William L. McKeown, Euless; Michael R. Smith, Bedford; Frank B. Stamps, Hurst, all of Tex.

[73] Assignee: Bell Helicopter Textron Inc., Fort Worth, Tex.

[21] Appl. No.: 221,836

[22] Filed: Apr. 1, 1994

[51] Int. Cl.⁶ .............................................. F16F 7/10
[52] U.S. Cl. .................................. 188/379; 188/367; 188/275; 267/140.14
[58] Field of Search ............... 188/378, 379, 380, 267, 188/275, 299, 317, 319, 322.22; 267/35, 259, 140.14, 140.15; 248/562, 636

[56] References Cited

U.S. PATENT DOCUMENTS

| | | | |
|---|---|---|---|
| 2,957,703 | 10/1960 | Ross | 188/275 X |
| 3,612,222 | 10/1971 | Manor | 188/379 |
| 4,236,607 | 12/1980 | Halwes et al. | 188/379 |
| 4,432,441 | 2/1984 | Kurokawa | 188/379 X |
| 4,636,910 | 1/1987 | Ozawa et al. | 267/140.15 X |

FOREIGN PATENT DOCUMENTS 4272539  9/1992  Japan .................... 188/380

*Primary Examiner*—Robert J. Oberleitner
*Assistant Examiner*—Lee W. Young
*Attorney, Agent, or Firm*—John M. Cone; William L. Clayborn

[57] ABSTRACT

A hydraulic inertial vibration isolator is connected between a vibrating body and an isolated body. The vibration isolator comprises a cylinder which includes two chambers and a piston therebetween. The chambers are connected by a tuning passage in which a solid tuning slug is slidably disposed. The chambers and the portion of the tuning passage not occupied by the tuning slug are filled with liquid. Bypass passages connecting the tuning passage to the chambers allow the liquid pressures in the chambers to equalize when the amplitude of the tuning slug's oscillatory motion is sufficiently large, thereby limiting the tuning slug's amplitude. Dashpots axially disposed adjacent to either end of the tuning slug act to damp excessive tuning slug motion and to bias the tuning slug toward the center of the tuning passage. In response to vibration of the isolated body to which the vibration isolator is attached, an electronic control system supplies an alternating current of appropriate amplitude and phase to one or more magnetic coils disposed adjacent to the tuning slug, thereby matching the isolation frequency of the vibrating body-vibration isolator-isolated body system with the vibration frequency and adding energy to the vibration isolator to compensate for damping losses. As a result, virtually no vibration is transferred from the vibrating body to the isolated body.

19 Claims, 3 Drawing Sheets

HYDRAULIC INERTIAL VIBRATION ISOLATOR

BACKGROUND OF THE INVENTION

U.S. Pat. No. 4,236,607 (Halwes et al.) discloses a spring-tuning mass vibration isolator in which force cancellation is accomplished by hydraulically amplifying the inertia of a tuning mass. Other hydraulic inertial vibration isolators are known in the art, such as those disclosed in U.S. Pat. Nos. 4,811,919 (Jones) and 5,174,552 (Hodgson et al.).

The preferred embodiment of the Halwes vibration isolator utilizes mercury both as hydraulic fluid and as the tuning mass. While mercury is quite dense and has low viscosity, both of which are advantageous properties, it is extremely corrosive and toxic. As a result, other, lower density liquids have been used in such vibration isolators. Unfortunately, the use of a lower density liquid requires that the size of the vibration isolator be increased to compensate for the liquid's decreased density.

Halwes also discloses another embodiment of the vibration isolator which utilizes a high density metal slug as the tuning mass and a relatively low density liquid as the hydraulic fluid. The size of a metal tuning slug vibration isolator is comparable with that of a mercury vibration isolator, and the metal tuning slug vibration isolator lacks the disadvantages associated with mercury. However, large amplitude vibration and/or vibration at frequencies near the natural frequency of the vibrating body-vibration isolator-isolated body system (the "system") can cause excessive metal tuning slug motion ("overtravel"), resulting in the metal tuning slug contacting the end sections of the vibration isolator. This can damage the vibration isolator, possibly causing it to fail. A means for limiting overtravel of the metal slug would minimize the possibility of such an occurrence.

A hydraulic inertial vibration isolator provides excellent vibration attenuation at a particular vibration frequency, the isolation frequency. However, vibration attenuation decreases rapidly as the vibration frequency varies from the isolation frequency. Thus, the vibration isolator is effective over a relatively narrow range of vibration frequencies. A means for varying the isolation frequency would allow the vibration isolator to be effective over a broader range of vibration frequencies.

Although hydraulic inertial vibration isolators are generally designed to have minimal damping, some damping is present. As a result, the degree of vibration isolation at the isolation frequency is less than ideal. A means for adding energy to the vibration isolator to compensate for losses due to damping would allow the unit to provide substantially ideal vibration isolation, i.e., 100% isolation.

It is an object of the present invention to provide a vibration isolator which utilizes a metal slug as a tuning mass and in which the amplitude of the metal slug's motion is limited to minimize the possibility of damage to the vibration isolator.

It is a further object of the present invention to provide a vibration isolator which allows the isolation frequency to be varied.

It is a further object of the present invention to provide a vibration isolator in which vibration isolation at the isolation frequency is virtually 100%.

SUMMARY OF THE INVENTION

The present invention is a hydraulic inertial vibration isolator for connection between a vibrating body and an isolated body. In a preferred embodiment of the invention, the vibration isolator comprises a closed cylinder and a piston disposed within the cylinder. One of the foregoing members is connected to the vibrating body, and the other member is connected to the isolated body. An elastomeric member is bonded between the cylinder and the piston. The elastomeric member acts as a spring and as a seal. The cylinder, piston, and elastomeric member form first and second chambers within the cylinder. The chambers are connected by a tuning passage in the piston, and a high density metal tuning slug is slidably disposed in the tuning passage. The chambers and the portion of the tuning passage not occupied by the tuning slug are filled with an incompressible, low viscosity liquid.

Vibration of the vibrating body along the axis of the cylinder causes relative motion between the cylinder and piston. The relative motion is resisted by a restoring force due to the spring action of the elastomeric member. The relative motion also causes the pressure of the liquid in one chamber to increase and the pressure of the liquid in the other chamber to decrease. When the direction of the vibration reverses, the liquid pressures in the chambers reverse. The oscillating pressure difference between the liquid in the two chambers applies an oscillating hydraulic force on the tuning slug, causing the tuning slug to oscillate along the axis of the tuning passage, thereby producing an oscillatory inertial force along the axis of the tuning passage. At the isolation frequency, the restoring and inertial forces substantially cancel each other. As a result, very little vibration is transmitted to the isolated body.

First and second bypass passages and associated one-way valves allow selective pressure equalization between the chambers when the tuning slug overtravels. The bypass passages and associated one-way valves act to reduce tuning slug overtravel when the vibration isolator is subjected to large amplitude vibration and/or vibration at frequencies near the natural frequency of the vibrating body-vibration isolator-isolated body system. In addition, the bypass passages and associated one-way valves act to center the tuning slug axially within the tuning passage when the vibration isolator is subjected to varying steady (nonoscillatory) loads.

Within each chamber, a dashpot axially aligned with the tuning slug is attached to the end of the cylinder. Each dashpot includes an orifice which connects the interior of the dashpot to the surrounding chamber, a one-way valve which prevents liquid flow from the interior of the dashpot to the surrounding chamber through the orifice, and a spring which is axially aligned with the tuning slug. The dashpots, orifices, one-way valves, and springs act to dampen excessive tuning slug overtravel and to bias the tuning slug toward the axial center of the tuning passage, thereby minimizing the possibility of the tuning slug causing damage to the vibration isolator.

The tuning slug is constructed of a magnetic material, and the piston is constructed of a nonmagnetic material. A control system supplies alternating current to one or more coils within the piston adjacent to the tuning slug. In response to the vibration of the isolated body, the control system varies the magnitude and phase of the current supplied to the coil or coils. The resulting electromagnetic force acts on the tuning slug. The control system acts to equate the isolation frequency to the vibration frequency and to compensate for vibration isolator damping losses, allowing the vibration isolator to provide virtually 100% isolation of the isolated body from vibrating body vibration.

BRIEF DESCRIPTION OF THE DRAWINGS

An embodiment of the invention will be described, by way of example only, with reference to the accompanying drawings, in which.

DETAILED DESCRIPTION

Figure 1:
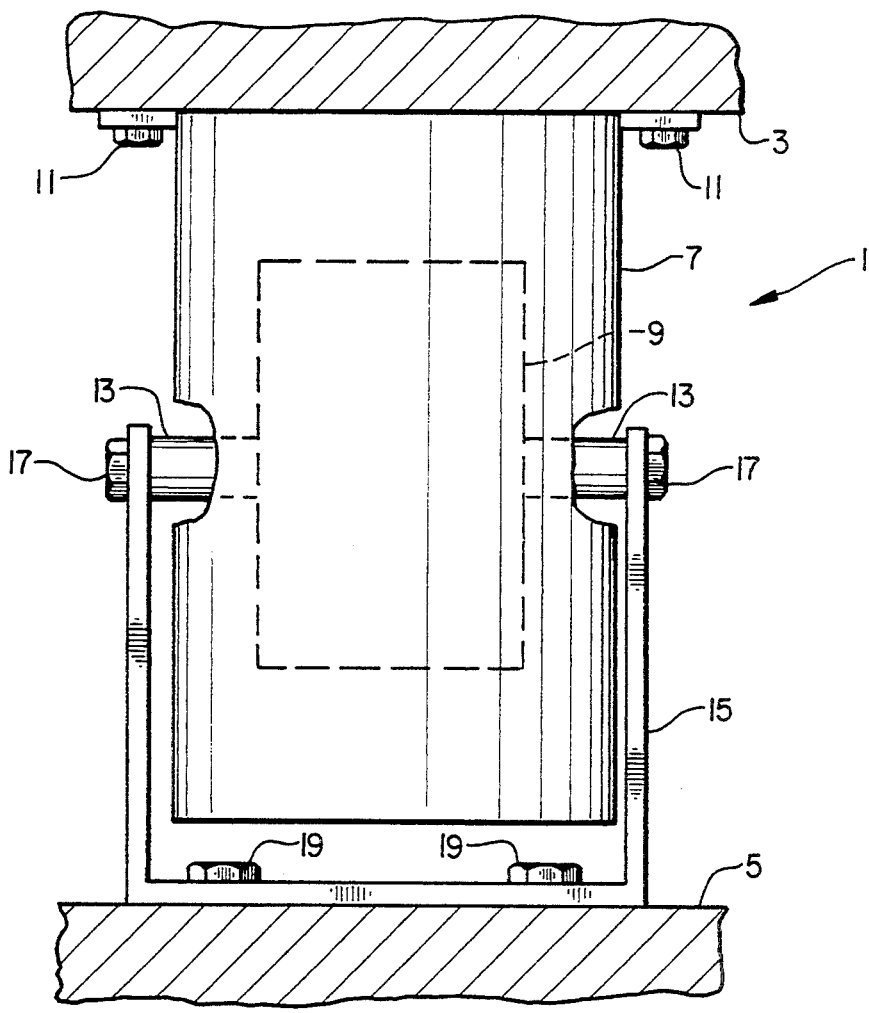
FIG. 1 is a system which includes a vibration isolator embodying the present invention.
Figure 2:
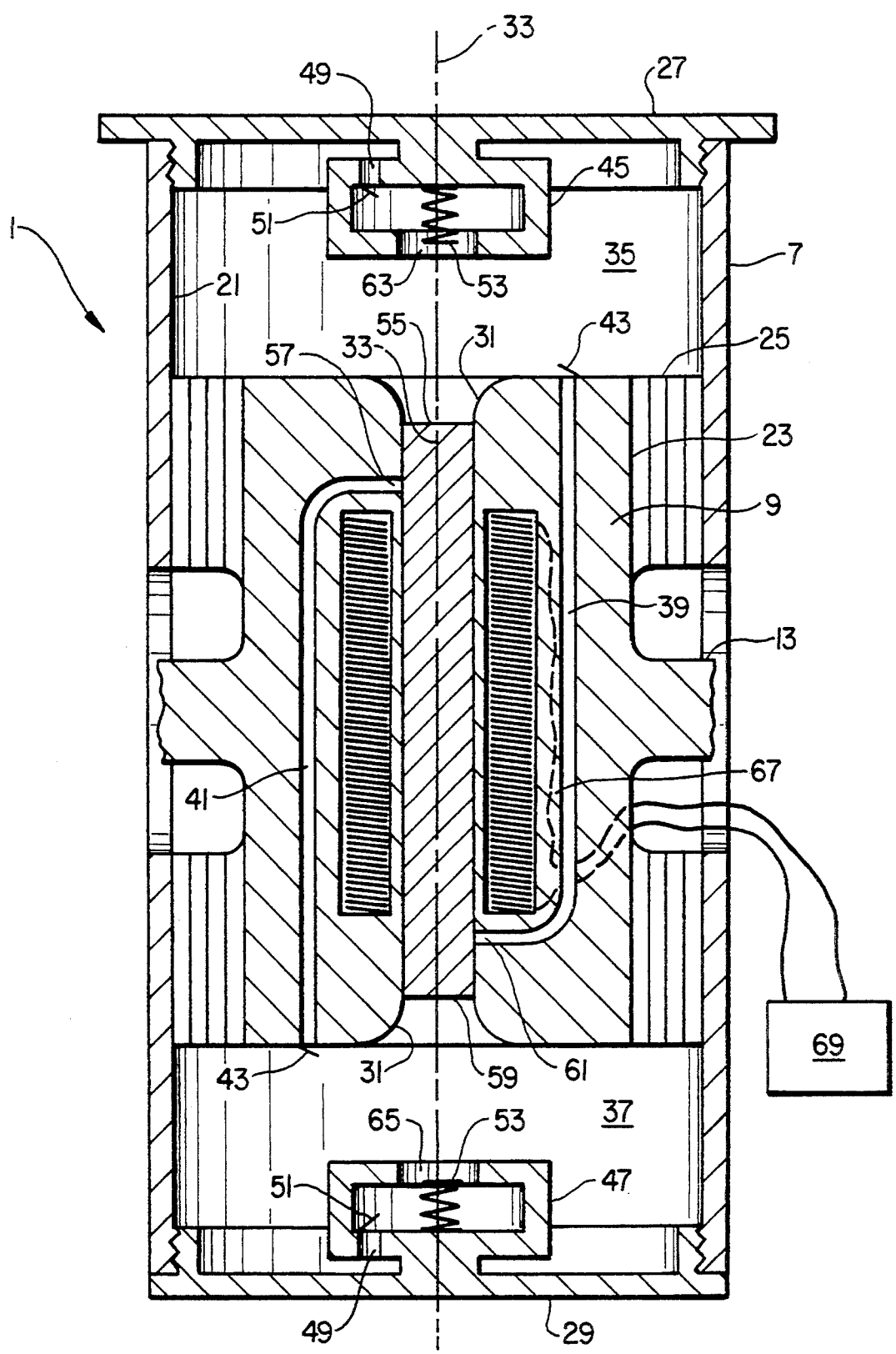
FIG. 2 is a sectional view, taken through plane 2—2 in FIG. 1, of a vibration isolator which includes the preferred embodiment of the invention.

Referring to FIGS. 1 and 2, a vibration isolator 1 is connected between a vibrating body 3 and an isolated body 5. The vibration isolator 1 comprises a cylinder 7 and a piston 9. The cylinder 7 is attached to the vibrating body 3 by two or more bolts 11. Two or more piston lugs 13, which are attached to the piston 9, are attached to a rigid support 15 by bolts 17. The rigid support 13 is attached to the isolated body 5 by bolts 19. It will be appreciated that the connections between the cylinder 7, the piston 9, the vibrating body 3, and the isolated body 5 can be reversed. That is, the piston 9 can be connected to the vibrating body 3 and the cylinder 7 can be connected to the isolated body 5.

An inner surface 21 of the cylinder 7 and an outer surface 23 of the piston 9 are bonded to an elastomeric member 25. The elastomeric member 25 acts as a spring and as a seal between the cylinder 7 and the piston 9. The ends of the cylinder 7 are sealed by upper and lower end caps 27, 29. The piston 9 includes an axial tuning passage 31 in which a metal tuning slug 33 is slidably disposed. The upper and lower end caps 27, 29, elastomeric member 25, the cylinder 7, piston 9, and tuning slug 33 form upper and lower chambers 35, 37. The chambers 35, 37 and the portion of the tuning passage 31 not occupied by the tuning slug 33 are filled with an incompressible, low viscosity liquid.

An upwardly extending bypass passage 39 connects the tuning passage 31 to the upper chamber 35, and a downwardly extending bypass passage 41 connects the tuning passage 31 to the lower chamber 37. Both bypass passages 39, 41 include one-way valves 43 which prevent liquid flow through the bypass passages 39, 41 from the upper and lower chambers 35, 37 to the tuning passage 31.

Upper and lower dashpots 45, 47 are connected to the upper and lower end caps 27, 29. Each dashpot 45, 47 includes an orifice 49 and a one-way valve 51 to prevent liquid flow from the interior of the dashpots 45, 47 to the respective surrounding chamber 35, 37 through the respective orifice 49. Each dashpot 45, 47 also includes a short spring 53 which acts as an overtravel bumper to prevent contact between the tuning slug 33 the upper and lower dashpots 45, 47.

When the vibration isolator 1 is exposed to vibration along a vertical axis 38, the cylinder 7 and the piston 9 move axially relative to each other. As a result, the volumes of the chambers 35, 37 are alternately increased and decreased, alternately decreasing and increasing the pressure of the liquid in the chambers 35, 37. The alternating difference in liquid pressure acts to accelerate the tuning slug 33 upwardly and downwardly within the tuning passage 31. That is, when the cylinder 7 moves downwardly relative to the piston 9, the pressure of the liquid in the upper chamber 35 increases and the pressure in the lower chamber decreases. The difference in the liquid pressures accelerates the slug downwardly. When the cylinder 7 moves upwardly relative to the piston 9, the reverse occurs.

The relative motion between the cylinder 7 and piston 9 is resisted by a restoring force which results from the spring action of the elastomeric member 25. Simultaneously, the acceleration of the tuning slug 33 caused by the difference in liquid pressures in the chambers 35, 37 produces an inertial force opposing the acceleration. The inertial force acts to increase the difference in liquid pressures in the chambers 35, 37, which acts on the cylinder 7 and the piston 9, producing accelerations in the vibrating body 3 and in the isolated body 5. These accelerations produce opposing inertial forces. The relative magnitudes and phases of the inertial forces and the restoring force change as the vibration frequency changes. As a result, the vibration force transferred from the vibrating body 3 through the vibration isolator 1 to the isolated body 5 varies with vibration frequency.

Figure 3:
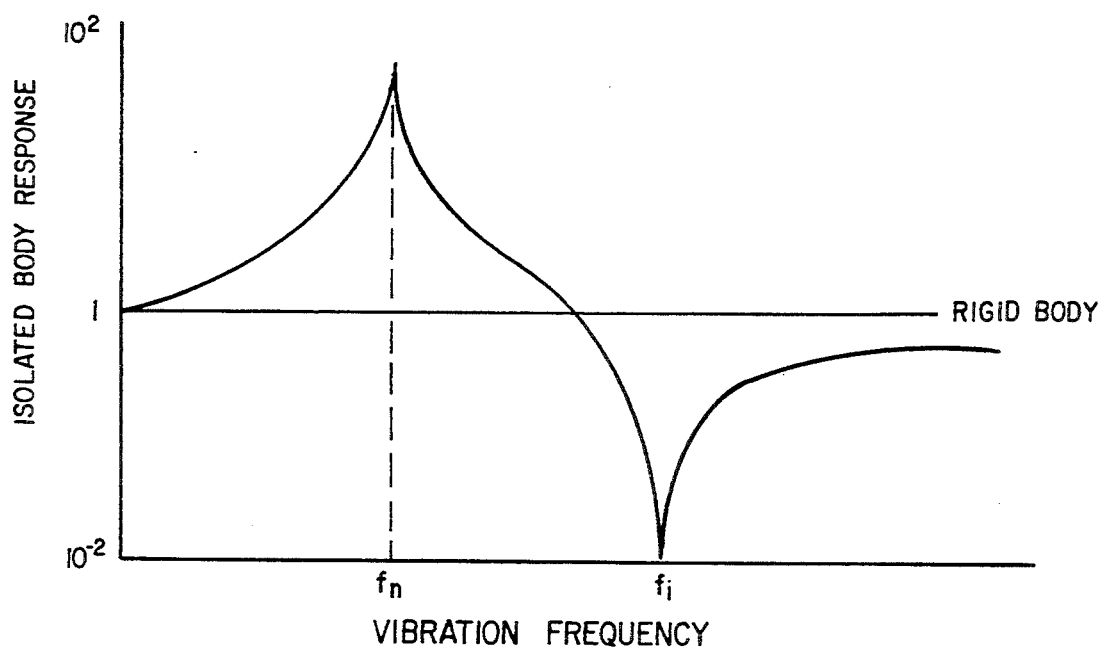
FIG. 3 is a plot illustrating the frequency response of the isolated body in the system shown in FIG. 1.

FIG. 3 is a plot illustrating the response of the isolated body 5 as the frequency of vibration of the vibrating body 3 is varied. As can be seen, the vibration transferred to the isolated body 5 is maximum at the natural frequency, $f_n$, of the of the vibrating body 3-vibration isolator 1-isolated body 5 system. The vibration transferred to the isolated body 5 is minimum at the isolation frequency, $f_i$.

Neglecting damping, the equation for the natural frequency, $f_n$, of the system is:

$$f_n = \frac{1}{2\pi}\sqrt{\frac{k(m_v + m_i + m_s)}{m_v m_i + (R-1)^2 m_i m_s + R^2 m_v m_s}},$$

where
k = spring rate of the elastomeric member 19;
R = the ratio of the cross sectional area of the piston 9 to the cross sectional area of the tuning passage 31;
$m_v$ = mass of the vibrating body 3;
$m_i$ = mass of the isolated body 5; and
$m_s$ = mass of the tuning slug 33.

Also neglecting damping, the equation for the isolation frequency, $f_i$, is:

$$f_i = \frac{1}{2\pi}\sqrt{\frac{k}{R(R-1)m_s}},$$

where
k = the spring rate of the elastomeric member 25;
R = the ratio of the effective cross sectional area of the piston 9 to the cross sectional area of the tuning passage 31; and
$m_s$ = mass of the tuning slug 33.

The oscillating liquid pressures in the upper and lower chambers 35, 37 are out of phase with each other. The difference between the liquid pressures in the chambers 35, 37 acts to accelerate the tuning slug 33 in the direction toward the chamber 35, 37 having the lower pressure. As a result, under steady state vibration conditions, the tuning slug oscillates upwardly and downwardly in the tuning passage 31 about a mean axial position. When the tuning slug 33 is at a maximum upward displacement during oscillation, the liquid pressure in the upper chamber 35 is at a maximum value and the liquid pressure in the lower chamber 37 is at a minimum value. As a result, the tuning slug experiences a maximum downward acceleration. As the tuning slug 33 moves downwardly, the liquid pressure in the upper chamber 35 decreases and the liquid pressure in the lower chamber 37 increases, decreasing the downward acceleration of the tuning slug 33. At the mean axial position, the liquid pressures in the chambers 35, 37 are equal, the downward acceleration of the tuning slug 33 is zero, and the downward velocity of the tuning slug 33 is a maximum value. As the tuning slug 33 continues to move downwardly, the liquid pressure in the lower chamber 37 becomes greater than the liquid pressure in the upper chamber 35. The resulting upward force causes an upward acceleration which decreases the downward velocity of the tuning slug 33. At a maximum downward displacement, the velocity of the tuning slug 33 is zero, the liquid pressure in the lower chamber 37 is a maximum value, and the liquid pressure in the upper chamber 35 is a minimum value. As a result, the tuning slug 33 experiences a maximum upward acceleration and begins to move upwardly, experiencing a maximum upward velocity and zero upward acceleration at the mean position. The oscillatory motion of the tuning slug 33 continues in a steady state manner until the vibration conditions change.

The bypass passages 39, 41 and associated one-way valves 43 act to decrease or eliminate tuning slug overtravel when the vibration isolator 1 is exposed to large amplitude vibration and/or vibration at frequencies near the natural frequency, $f_n$, of the system. When high pressure liquid in the upper chamber 35 and low pressure liquid in the lower chamber 35 cause a sufficient downward displacement of the tuning slug 33 to place the top 55 of the tuning slug 33 below the entrance 57 to the downwardly extending bypass passage 41, the liquid pressures in the two chambers 35, 37 equalize. This removes the hydraulic force acting to accelerate the tuning slug 33 downwardly, and the tuning slug 33 achieves its maximum downward velocity. As the tuning slug 33 continues downwardly, the liquid pressure in the upper chamber 35 decreases and the liquid pressure in the lower chamber 35 increases. The one-way valve 43 associated with the downwardly extending bypass passage 41 prevents equalization of the liquid pressures in the two chambers 35, 37. As a result, the difference in the liquid pressures in the two chambers 35, 37 produces a force which opposes the downward motion of the tuning slug 33. This force decreases the velocity of the tuning slug 33 to zero, then causes the tuning slug 33 to move upwardly.

It will be appreciated that the pressure equalization removes the downward force earlier in the downward displacement of the tuning slug 33 than would be the case without pressure equalization. As a result, the maximum downward velocity of the tuning slug 33 decreases, decreasing the downward momentum of the tuning slug 33. In addition, pressure equalization increases the maximum liquid pressure in the lower chamber 37, increasing the upward force applied to the tuning slug 33. Due to decreased downward momentum and increased upward force, the mean axial position of the tuning slug 33 moves upward, thereby eliminating or decreasing downward overtravel.

When large amplitude vibration and/or vibration at frequencies near the natural frequency, $f_n$, of the system cause sufficient upward displacement of the tuning slug 33 to place the bottom end 59 of the tuning slug 33 above the entrance 61 of the upwardly extending bypass passage 39, the reverse of the foregoing occurs. That is, high liquid pressure in the lower chamber 37 and low liquid pressure in the upper chamber 35 equalize. As a result, the mean axial position of the tuning slug 33 moves downward, eliminating or decreasing upward overtravel.

When the steady (nonoscillatory) load applied to the vibration isolator 1 changes, the mean axial position of tuning slug oscillation shifts away from the axial center of the tuning passage 31. If the mean axial position shift is sufficient to cause the tuning slug 33 to overtravel, the applicable bypass passage 39, 41 and associated one-way valve 43 function as described above. As a result, the tuning slug 33 will be moved in the direction opposite to the mean axial position shift a sufficient distance so that at all times during tuning slug oscillation the upper end 55 of the tuning slug 33 is above the entrance 57 to the downwardly extending bypass passage 41 and the lower end 59 of the tuning slug 33 is below the entrance 61 to the upwardly extending bypass passage 39.

If the actions of the bypass passages 39, 41 and associated one-way valves 43 are not sufficient to prevent excessive overtravel of the tuning slug 33, the tuning slug 33 will enter at least one of the dashpots 45, 47 through the respective entry passage 63, 65. As the top 55 or bottom 59 of the tuning slug 33 enters a dashpot 45, 47, the portion of the tuning slug 33 within the entry passage 63, 65 of the dashpot 45, 47 restricts the flow of liquid from the interior of the dashpot 45, 47 to the surrounding chamber 35, 37 through the entry passage 63, 65. Simultaneously, the associated one-way valve 51 prevents liquid flow through the associated orifice 49. As a result, motion of the tuning slug 33 into the dashpot 45, 47 is damped significantly. This damping, in combination with the resistance of the spring 53 to motion of the tuning slug 33 into the dashpot 45, 47, minimizes the possibility of damage to the vibration isolator 1 due to overtravel of the tuning slug 33.

When the motion of the tuning slug 33 is out of a dashpot 45, 47, the associated one-way valve 51 opens, allowing liquid to flow from the surrounding chamber 35, 37 to the interior of the dashpot 45, 47. As a result, damping of tuning slug motion out of the dashpot 45, 47 is less than that into the dashpot 45, 47. This difference in damping acts to bias the tuning slug 33 toward the center of the tuning passage 31. The springs 53 also act to bias the tuning slug 33 toward the center of the tuning passage 31.

Referring to the equation for isolation frequency, $f_i$, it will be appreciated that changing the mass, $m_s$, of the tuning slug 33 changes the isolation frequency, $f_i$. As discussed below, the preferred embodiment of the invention includes means to change the apparent mass of the tuning slug 33, thereby changing the isolation frequency, $f_i$.

If the vibration isolator 1 had no damping, no vibration would be transferred from the vibrating body 3 to the isolated body 5 at the isolation frequency, $f_i$. Although the vibration isolator 1 is designed to minimize damping, a small amount of damping is present. As is discussed below, the means which changes the apparent mass of the tuning slug 33 also adds energy to the vibration isolator 1 to compensate for damping losses, resulting in very nearly 100% isolation.

In the preferred embodiment of the invention, the tuning slug 33 is constructed of a magnetic material, such as cold rolled steel. Other magnetic materials, such as a nickel-cobalt alloy could be used. The piston 9 is constructed of a copper-beryllium alloy, a nonmagnetic material with good wear-resistance properties. Again, other suitable nonmagnetic materials, such as aluminum-bronze alloy, could be used.

One or more magnetic coils 67 are disposed in the piston 9 adjacent to the tuning slug 33. The orientation of the coil or coils 67 is such that an alternating current supplied to the coil or coils 67 applies a magnetic force to the tuning slug 33 which is parallel to the axis of motion of the tuning slug 33. The component of the magnetic force which is in or out of phase with the acceleration of the tuning slug 33 changes the apparent mass of the tuning slug 33, thereby changing the isolation frequency, $f_i$. The component of the magnetic force which is in phase with the velocity of the tuning slug 33 adds energy to the vibration isolator 1, thereby compensating for energy lost due to damping. A conventional electronic control system 69 senses the vibration of the isolated body 5 and automatically adjusts the amplitude and phase of the alternating current supplied to the coil or coils 67 to minimize that vibration.

Figure 4:
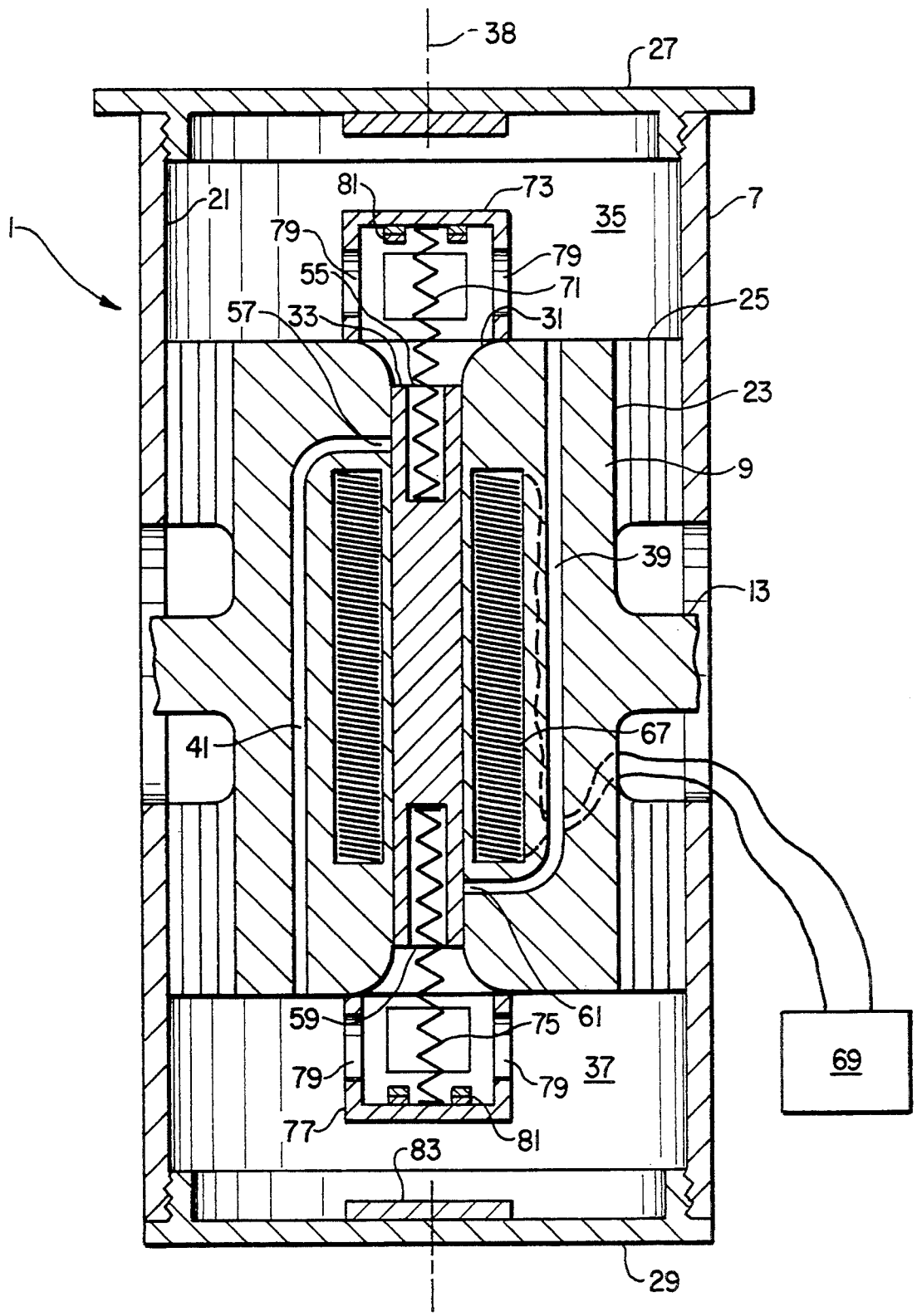
FIG. 4 is a sectional view, taken through plane 2—2 in FIG. 1, of a vibration isolator which includes an alternate embodiment of the present invention.

FIG. 4 shows a vibration isolator 1 which includes an alternate embodiment of the present invention. The operation of the vibration isolator 1 is identical to that of the vibration isolator 1 shown in FIG. 2, except alternate means are provided for dealing with overtravel of the tuning slug 33.

One end of an upper centering spring 71 is attached to the tuning slug 33 and other end is attached to an upper centering spring support 73. Similarly, one end of a lower centering spring 75 is connected to the tuning slug 33 and the other end is connected to a lower centering spring support 77. A number of apertures 79 in the spring supports 73, 77 allow unrestricted liquid flow through the spring supports 73, 77.

Neglecting damping, the equations for the natural frequency, $f_n$, and the isolation frequency, $f_i$, are:

$$f_n = \frac{1}{2\pi} \sqrt{\frac{(k + 2k_s R^2)(m_v + m_i + m_s)}{m_v m_i + (R-1)^2 m_i m_s + R^2 m_v m_s}},$$

and $$f_i = \frac{1}{2\pi} \sqrt{\frac{k + 2k_s R^2}{R(R-1)m_s}},$$

where
k = spring rate of the elastomeric member 19;
$k_s$ = the spring rate of the centering springs 73, 75;
R = the ratio of the cross sectional area of the piston 9 to the cross sectional area of the tuning passage 31;
$m_v$ = mass of the vibrating body 3;
$m_i$ = mass of the isolated body 5; and
$m_s$ = mass of the tuning slug 33.

The bypass passages 39, 41 and centering springs 71, 75 act to decrease or eliminate tuning slug overtravel when the vibration isolator 1 is exposed to large amplitude vibration and/or vibration at frequencies near the natural frequency, $f_n$, of the system or when the steady (nonoscillatory) load applied to the vibration isolator 1 changes. When tuning slug oscillation is such that the top 55 of the tuning slug 33 is placed below the entrance 57 the downwardly extending bypass passage 41 or the bottom 59 of the tuning slug 33 is placed above the entrance 61 to the upwardly extending bypass passage 39, the liquid pressures in the chambers 35, 37 equalize. This removes the hydraulic force acting on the tuning slug 33. The forces produced by the centering springs 71, 75 decelerate the tuning slug 33, then accelerate it toward a centered position in the tuning passage 31. If the actions of the bypass passages 39, 41 and centering springs 71, 75 are not sufficient to prevent excessive tuning slug overtravel, elastomeric dampers 81 in the spring supports 73, 77 decrease the possibility of damage to the vibration isolator 1 due to contact between the tuning slug 33 and the spring supports 73, 77. In addition, elastomeric dampers 83 on the upper and lower end caps 27, 29 decrease the possibility of damage to the vibration isolator 1 due to contact between the spring supports 73, 77 and the end caps 27, 29.

The present invention allows a compact, highly efficient vibration isolator 1 which provides virtually 100% isolation over a relatively broad frequency range. In one application, less than 600 watts of electrical power is required to shift the isolation frequency, $f_i$, of the vibration isolator 1 down by 10% and up by 25%.

While the described embodiments of the present invention are directed to a vibration isolator configured in the manner disclosed in Halwes, it will be apparent to those skilled in the art that the present invention can be applied to hydraulic inertial vibration isolators having different configurations without departing from the spirit of the present invention. For that reason, the scope of the invention is set forth in the following claims.

We claim:
1. A vibration isolator comprising:
two chambers;
a piston operable to vary the volumes of said chambers;
a tuning passage connecting said chambers;
a tuning slug slidably disposed in said tuning passage and contacting an inner surface thereof;
a fluid filling said chambers and any portion of said tuning passage not occupied by said tuning slug; and
at least one bypass passage providing fluid communication between said chambers, said communication being controlled by said tuning slug.
2. The vibration isolator of claim 1, wherein:
said at least one bypass passage comprises two bypass passages;
each of said bypass passages has an entrance in said tuning passage; and
said entrances are spaced apart along an axis of said tuning passage.
3. The vibration isolator of claim 1 further comprising a one-way valve associated with said at least one bypass passage.
4. The vibration isolator of claim 1 further comprising at least one damper aligned with an axis of said tuning slug.
5. The vibration isolator of claim 4 wherein said at least one damper comprises a dashpot.

6. The vibration isolator of claim 5 wherein said at least one dashpot includes a one-way valve.

7. The vibration isolator of claim 5 wherein said at least one dashpot includes a spring axially aligned with said tuning slug.

8. The vibration isolator of claim 1 further comprising: means for applying an axial magnetic force to said tuning slug.

9. The vibration isolator of claim 8 wherein said magnetic force means comprises at least one electromagnetic coil axially aligned with said tuning slug.

10. The vibration isolator of claim 1 further comprising at least one spring operable to urge said tuning slug toward an axially centered position within said tuning passage.

11. A vibration isolator comprising:
- a housing having a piston disposed therein, said housing and said piston defining a first chamber and a second chamber;
- a tuning passage connecting said chambers;
- a tuning slug slidably disposed in said tuning passage, said tuning slug being at least partially constructed of a magnetic material;
- a fluid filling said chambers and any portion of said tuning passage not occupied by said tuning slug; and
- means for applying an axial magnetic force to said tuning slug.

12. The vibration isolator of claim 11 wherein said magnetic means comprises at least one electromagnetic coil axially aligned with said tuning slug.

13. The vibration isolator of claim 11 further comprising:
- a first bypass passage having a first end in fluid communication with said first chamber and a second end connected to a portion of said tuning passage that is in fluid communication with said second chamber when said tuning slug is in a first range of positions in said tuning chamber; and
- a second bypass passage having a first end in fluid communication with said second chamber and a second end connected to a portion of said tuning passage that is in fluid communication with said first chamber when said tuning slug is in a second range of positions in said tuning passage.

14. The vibration isolator of claim 13 further comprising:
- a first valve associated with said first bypass passage, which valve prevents fluid communication between said second chamber and said first chamber through said first bypass passage; and
- a second valve associated with said second bypass passage, which valve prevents fluid communication between said first chamber and said second chamber through said second bypass passage.

15. The vibration isolator of claim 11 further comprising at least one damper aligned with an axis of said tuning slug.

16. The vibration isolator of claim 15 wherein said at least one damper comprises a dashpot.

17. The vibration isolator of claim 16 wherein said at least one dashpot includes a one-way valve.

18. The vibration isolator of claim 16 wherein said at least one dashpot includes a spring axially aligned with said tuning slug.

19. The vibration isolator of claim 11 further comprising at least one spring operable to urge said tuning slug toward an axially centered position within said tuning passage.

* * * * *